(12) United States Patent
Ikeda

(10) Patent No.: US 12,380,549 B2
(45) Date of Patent: Aug. 5, 2025

(54) FLOW-RATE INFORMATION OUTPUT APPARATUS, CONTROL METHOD, AND NON-TRANSITORY COMPUTER-READABLE MEDIUM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 468 days.

(21) Appl. No.: 17/794,825

(22) PCT Filed: Feb. 3, 2020

(86) PCT No.: PCT/JP2020/003895
§ 371 (c)(1),
(2) Date: Jul. 22, 2022

(87) PCT Pub. No.: WO2021/156907
PCT Pub. Date: Aug. 12, 2021

(65) Prior Publication Data
US 2023/0093919 A1  Mar. 30, 2023

(51) Int. Cl.
*G06T 7/90* (2017.01)
*G06T 7/00* (2017.01)

(52) U.S. Cl.
CPC .............. *G06T 7/0004* (2013.01); *G06T 7/90* (2017.01); *G06T 2207/30204* (2013.01)

(58) Field of Classification Search
CPC .................... G06T 7/0004; G06T 7/90; G06T 2207/30204
See application file for complete search history.

(56) References Cited

U.S. PATENT DOCUMENTS

| 2013/0113934 A1 | 5/2013 | Hotta et al. |
| 2019/0012647 A1 | 1/2019 | Togashi et al. |
| 2019/0102630 A1 | 4/2019 | Bamba et al. |
| 2019/0230320 A1 | 7/2019 | Moriya et al. |

FOREIGN PATENT DOCUMENTS

| JP | 2012-022370 A | 2/2012 |
| JP | 2019-012494 A | 1/2019 |
| JP | 2019-067208 A | 4/2019 |
| WO | 2017/122258 A1 | 7/2017 |
| WO | 2018/011944 A1 | 1/2018 |

OTHER PUBLICATIONS

International Search Report for PCT Application No. PCT/JP2020/003895, mailed on Mar. 31, 2020.

*Primary Examiner* — Sam Bhattacharya

(57) ABSTRACT

A flow-rate information output apparatus (2000) computes the number of objects (20) passing through a surveillance location (30) included in a target image (10) with respect to each of a plurality of surveillance directions (34). The flow-rate information output apparatus (2000) generates, with respect to one or more surveillance directions (34), a flow rate mark (40) relevant to the number of objects (20) passing through the surveillance location (30) toward the surveillance direction (34). The flow-rate information output apparatus (2000) generates a result image (60) by superimposing the flow rate mark (40) on an image including the surveillance location (30).

20 Claims, 16 Drawing Sheets

FIG. 9
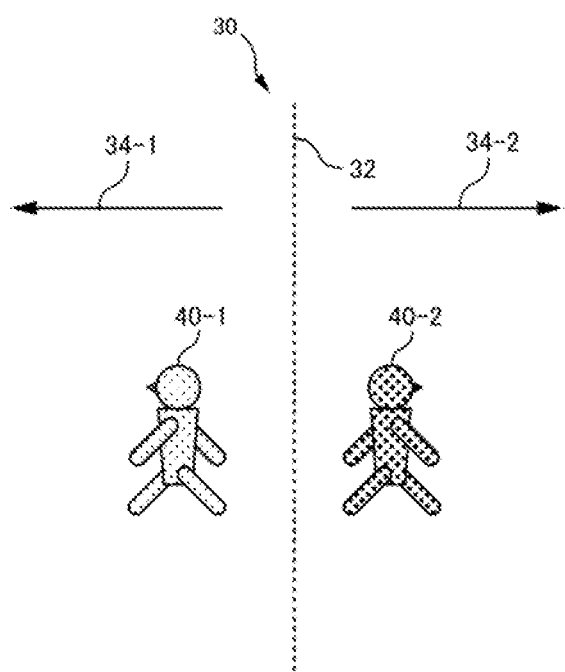
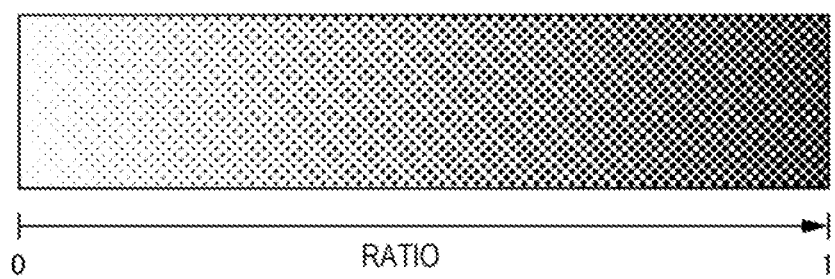

FLOW-RATE INFORMATION OUTPUT APPARATUS, CONTROL METHOD, AND NON-TRANSITORY COMPUTER-READABLE MEDIUM

This application is a National Stage Entry of PCT/JP2020/003895 filed on Feb. 3, 2020, the contents of all of which are incorporated herein by reference, in their entirety.

TECHNICAL FIELD

The present invention relates to presentation of information relating to a flow rate of an object.

BACKGROUND ART

A technique for performing, based on an image analysis, estimation of a people flow has been developed. Patent Document 1 discloses a technique for measuring a people flow in a plurality of locations in a region, and generating, by using the measurement result, a congestion-degree distribution in the region. Patent Document 2 discloses a technique for detecting a crowd from a surveillance-camera video, modeling, by using the detection result, a crowd behavior pattern, and thereby also estimating a congestion degree for an area outside a range of the surveillance camera.

RELATED DOCUMENT

Patent Document

[Patent Document 1] Japanese Patent Application Publication No. 2019-012494
[Patent Document 2] International Publication No. WO2017/122258

DISCLOSURE OF THE INVENTION

Technical Problem

Both of Patent Documents 1 and 2 focus on recognition of a congestion degree and disclose a technique for visualizing a congestion degree. However, either Patent Document 1 or Patent Document 2 does not refer to necessity for visualizing a people flow.

In view of the problem, the present invention has been made, and one of objects of the present invention is to provide a technique capable of easily recognizing a flow of an object.

Solution to Problem

A flow-rate information output apparatus according to the present invention includes: 1) a computation unit that computes, by using a target image including an object passing through a surveillance place, the number of objects passing through the surveillance place with respect to each of a plurality of surveillance directions; and 2) an output unit that generates, with respect to at least one surveillance direction, a flow rate mark relevant to the number of objects passing through the surveillance place toward the surveillance direction, and generates a result image by superimposing the flow rate mark on an image including the surveillance place.

A control method according to the present invention is executed by a computer. The control method includes: 1) a computation step of computing, by using a target image including an object passing through a surveillance place, the number of objects passing through the surveillance place with respect to each of a plurality of surveillance directions; and 2) an output step of generating, with respect to at least one surveillance direction, a flow rate mark relevant to the number of objects passing through the surveillance place toward the surveillance direction, and generating a result image by superimposing the flow rate mark on an image including the surveillance place.

A program according to the present invention causes a computer to execute the control method according to the present invention.

Advantageous Effects of the Invention

According to the present invention, a technique capable of easily recognizing a flow of an object is provided.

BRIEF DESCRIPTION OF THE DRAWINGS

FIG. 9 is a diagram illustrating a case where, according to a ratio of the number of objects, a color of a flow rate mark is determined.

DESCRIPTION OF EMBODIMENTS

Hereinafter, an example embodiment according to the present invention is described by using the accompanying drawings. Note that, in all drawings, a similar component is assigned with a similar reference sign, and description thereof is omitted as appropriate. Further, unless otherwise specifically described, in each block diagram, each block does not represent a configuration based on a hardware unit but represents a configuration based on a function unit.

<Outline>

Figure 1:
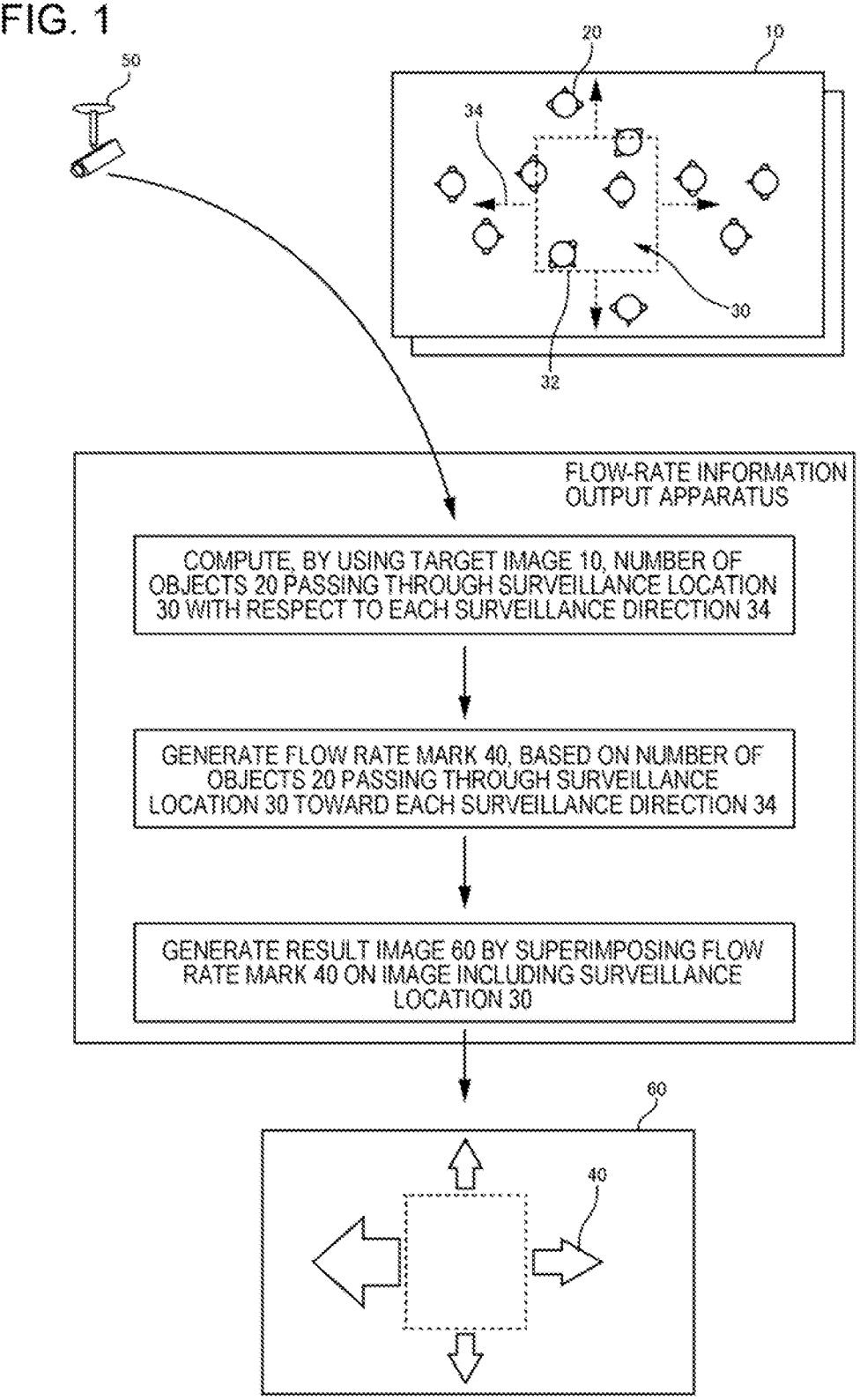
FIG. 1 is a diagram illustrating an outline of an operation of a flow-rate information output apparatus according to the present example embodiment.

FIG. 1 is a diagram illustrating an outline of an operation of a flow-rate information output apparatus 2000 according to the present example embodiment. FIG. 1 is a diagram representing conceptual illustration for easily understanding an operation of the flow-rate information output apparatus 2000, and is not intended to specifically limit an operation of the flow-rate information output apparatus 2000.

The flow-rate information output apparatus 2000 outputs, with respect to a predetermined location (surveillance location 30) included in a target image 10, information relating to the number of objects 20 passing through the surveillance location 30. The target image 10 is generated by a camera 50. The surveillance location 30 is a predetermined place included in the target image 10. In other words, the surveillance location 30 is a predetermined place included in an image-capture range of the camera 50. Note that, in the target image 10 illustrated in FIG. 1, an example acquired by capturing an image from directly above is illustrated, but an image-capture angle of view of the target image 10 is not limited and an image may be captured from any angle of view.

As an object 20, any moving object (an object a location of which is movable) can be handled. As an object 20, for example, a man and another animal, and an automobile and another vehicle can be handled. Herein, instead of one object, a set of a plurality of objects can be handled as an object 20. This is a case or the like where, for example, a cluster (crowd) of several people is handled as one object 20. In contrast, a part of one object may be handled as an object 20. This is a case or the like where, instead of a whole of a person, only a head portion of a person is handled as an object 20.

The flow-rate information output apparatus 2000 computes, with respect to each surveillance direction 34, the number of objects 20 passing through the surveillance location 30. It is assumed that the surveillance location 30 and the surveillance direction 34 relevant to the surveillance location 30 are previously determined.

It is assumed that, for example, a surveillance location 30 is a T-shaped intersection, and, as a surveillance direction 34, three directions each heading outward from the T-shaped intersection are determined. In this case, the flow-rate information output apparatus 2000 computes, with respect to the surveillance location 30, the number of objects 20 moving toward each of the three surveillance directions 34.

The flow-rate information output apparatus 2000 generates, with respect to one or more surveillance directions 34 relevant to the surveillance location 30, a flow rate mark 40 relevant to the surveillance direction 34. The flow rate mark 40 relevant to the surveillance direction 34 is generated based on an absolute number or a relative number of objects 20 moving toward the surveillance direction 34. In the latter case, for example, the flow rate mark 40 relevant to the surveillance direction 34 is computed based on a ratio of the number of objects 20 moving to the surveillance direction 34 to a total number of objects 20 passing through the surveillance location 30.

The flow-rate information output apparatus 2000 superimposes the generated flow rate mark 40 on an image including the surveillance location 30, and thereby generates a result image 60. Then, the flow-rate information output apparatus 2000 outputs the result image 60. Herein, an image on which the flow rate mark 40 is superimposed may be the target image 10 or may not necessarily be the target image 10. In the latter case, the flow-rate information output apparatus 2000 superimposes, for example, the flow rate mark 40 on an image (hereinafter, referred to as a background image) acquired by causing the camera 50 to capture an image in a situation including no object 20. In addition, the flow-rate information output apparatus 2000 may superimpose, for example, the flow rate mark 40 on an image of a map including the surveillance location 30.

<Representative Advantageous Effect>

According to the flow-rate information output apparatus 2000, the number of objects 20 passing through the surveillance location 30 is computed with respect to each surveillance direction 34. Further, with regard to each surveillance direction 34, based on the number of objects 20 computed for the surveillance direction 34, the flow rate mark 40 is generated. Then, the flow rate mark 40 is superimposed on an image including the surveillance location 30, and the superimposed image is output. Therefore, a user of the flow-rate information output apparatus 2000 views an image output by the flow-rate information output apparatus 2000, and thereby can easily recognize a flow of the object 20 in the surveillance location 30.

When a flow of the object 20 is recognized, various matters can be achieved. For example, a security guard conducting surveillance and security of a facility provided with the camera 50 recognizes a flow of the object 20 by using the flow-rate information output apparatus 2000, and thereby can recognize a place to which the object 20 needs to be guided. When, for example, many objects 20 are moving toward the same place from each of a plurality of surveillance locations 30, a flow of the objects 20 is preferably changed.

A user of the flow-rate information output apparatus 2000 is not limited to a security guard. When, for example, a user of a facility provided with the camera 50 is provided with information (an image output from the flow-rate information output apparatus 2000) relating to a flow rate of the object 20, the user him/herself can recognize an appropriate moving path where a flow rate of the object 20 is considered.

Hereinafter, the flow-rate information output apparatus 2000 according to the present example embodiment is described in more detail.

Example of Function Configuration of Flow-Rate Information Output Apparatus 2000

Figure 2:
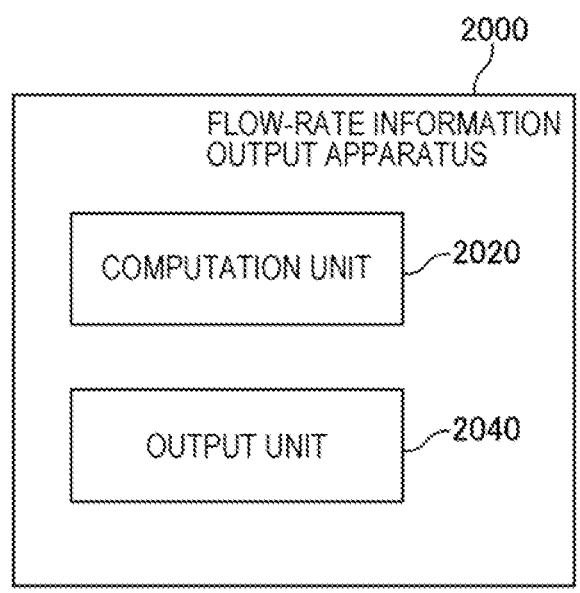
FIG. 2 is a diagram illustrating a configuration of a flow-rate information output apparatus according to an example embodiment 1.

FIG. 2 is a diagram illustrating a configuration of a flow-rate information output apparatus 2000 according to an example embodiment 1. The flow-rate information output apparatus 2000 includes a computation unit 2020 and an output unit 2040. The computation unit 2020 computes, by using a target image 10, the number of objects 20 passing through a surveillance location 30 with respect to each surveillance direction 34. The output unit 2040 generates, with respect to at least one surveillance direction 34, a flow rate mark 40 relevant to an absolute number or a relative number of objects 20 passing through the surveillance location 30 toward the surveillance direction 34. Further, the output unit 2040 superimposes the generated flow rate mark 40 on an image including the surveillance location 30 and outputs the superimposed image.

<Hardware Configuration of Flow-Rate Information Output Apparatus 2000>

Each function configuration unit of the flow-rate information output apparatus 2000 may be achieved by hardware (e.g., a hard-wired electronic circuit or the like) for achieving each function configuration unit, or may be achieved by a combination of hardware and software (e.g., a combination of an electronic circuit and a program for controlling the electronic circuit, or the like). Hereinafter, a case where each function configuration unit of the flow-rate information output apparatus 2000 is achieved by a combination of hardware and software is further described.

Figure 3:
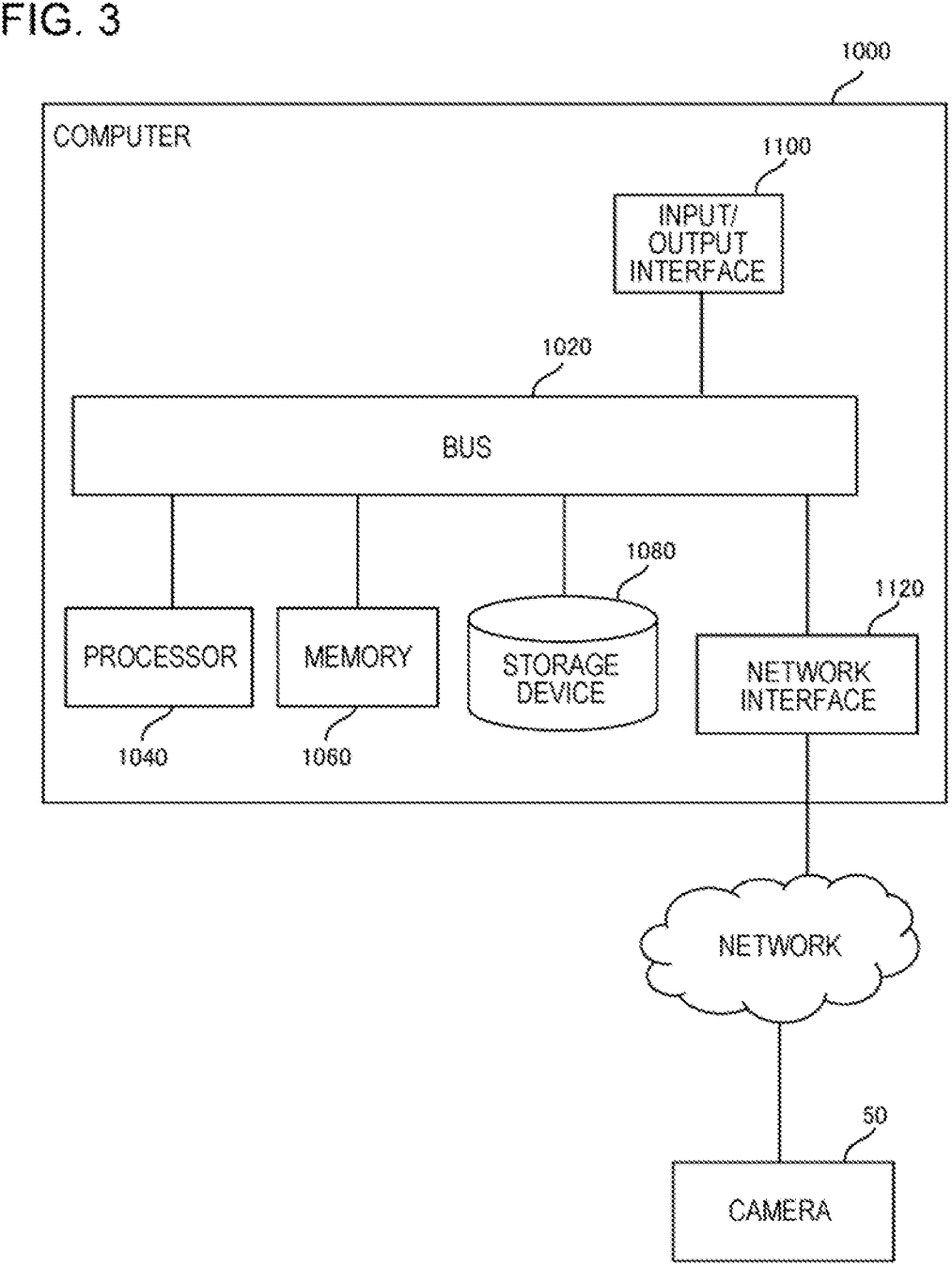
FIG. 3 is a diagram illustrating a computer for achieving the flow-rate information output apparatus.

The flow-rate information output apparatus 200 is achieved, for example, by one computer. FIG. 3 is a diagram illustrating a computer 1000 for achieving the flow-rate information output apparatus 2000. The computer 1000 is any computer. The computer 1000 is, for example, a personal computer (PC), a server machine, a tablet terminal, a smartphone, or the like. The computer 1000 may be a dedicated computer designed for achieving the flow-rate information output apparatus 2000 or a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 mutually transmit/receive data. A method of mutually connecting the processor 1040 and the like is not limited to bus connection. The processor 1040 is a processor such as a central processing unit (CPU), a graphics processing unit (GPU), or a field-programmable gate array (FPGA). The memory 1060 is a main storage apparatus achieved by using a random access memory (RAM) or the like. The storage device 1080 is an auxiliary storage apparatus achieved by using a hard disk drive, a solid state drive (SSD), a memory card, a read only memory (ROM), or the like. However, the storage device 1080 may be configured by using hardware similar to hardware, such as a RAM, configuring a main storage apparatus.

The input/output interface 1100 is an interface for connecting the computer 1000 and an input/output device. The network interface 1120 is an interface for connecting the computer 1000 to a communication network. The communication network is, for example, a local area network (LAN) or a wide area network (WAN). A method for connection to a communication network based on the network interface 1120 may be wireless connection or may be wired connection.

The storage device 1080 stores a program module for achieving the function configuration unit of the flow-rate information output apparatus 2000. The processor 1040 reads each of the program modules onto the memory 1060, executes the read program module, and thereby achieves a function relevant to each program module.

The flow-rate information output apparatus 2000 may be achieved by two or more computers. Each computer in this case also includes, for example, a hardware configuration illustrated in FIG. 3.

Herein, at least a part of a function of the flow-rate information output apparatus 2000 may be achieved by a camera 50. In other words, the camera 50 may be used as one of computers achieving the flow-rate information output apparatus 2000. Regarding the camera 50 achieving at least a part of a function of the flow-rate information output apparatus 2000 in such a manner, a camera referred to as, for example, an intelligent camera, a network camera, an Internet protocol (IP) camera, or the like is usable.

<Flow of Processing>

Figure 4:
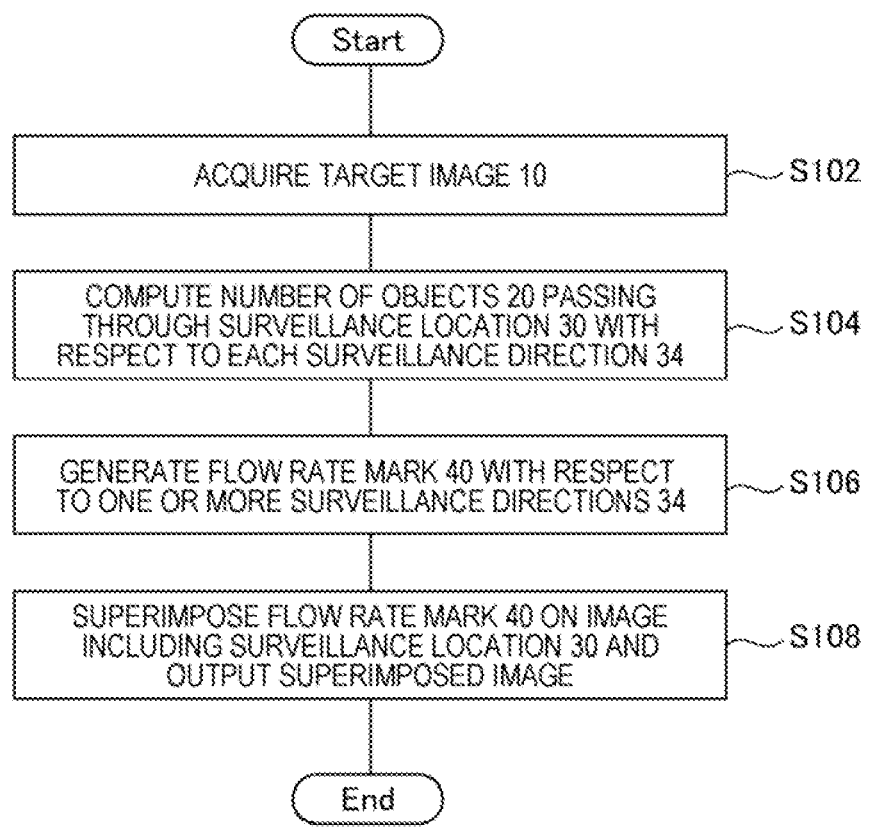
FIG. 4 is a flowchart illustrating a flow of processing executed by the flow-rate information output apparatus according to the example embodiment 1.

FIG. 4 is a flowchart illustrating a flow of processing executed by the flow-rate information output apparatus 2000 according to the example embodiment 1. The computation unit 2020 acquires the target image 10 (S102). The computation unit 2020 computes, with respect to each surveillance direction 34, the number of objects 20 passing through the surveillance location 30 in the surveillance direction 34 (S104). The output unit 2040 generates, based on the computed number of objects 20, the flow rate mark 40 relevant to one or more surveillance directions 34 (S106). The output unit 2040 superimposes the flow rate mark 40 on an image including the surveillance location 30 and outputs the superimposed image (S108).

Any timing of executing, by the flow-rate information output apparatus 2000, a series of pieces of processing illustrated in FIG. 4 is applicable. The flow-rate information output apparatus 2000 executes processing illustrated in FIG. 4, for example, at a periodic timing such as once every one minute, once every ten minutes, and the like. By doing so, the flow rate mark 40 is periodically generated (updated). In addition, the flow-rate information output apparatus 2000 may execute a series of pieces of processing illustrated in FIG. 4, for example, in response to reception of a predetermined input operation by a user.

<Acquisition of Target Image 10: S102>

The computation unit 2020 acquires the target image 10 to be processed (S102). The target image 10 is any image acquired by capturing an image of the surveillance location 30 by using the camera 50. The camera 50 is, for example, a surveillance camera provided in a place where it is necessary to survey the object 20.

The camera 50 may be a video camera for generating a moving image, or may be a still camera for generating a still image. In the former case, the target image 10 is a video frame configuring a moving image generated by the camera 50.

Note that, the camera 50 is not limited to a camera that captures an image based on visible light, and may be a camera that captures an image based on invisible light such as infrared light. Further, a ranging apparatus that measures a distance to an object present within an image-capture range and generates a distance image representing the measurement result can be also handled as the camera 50. In this case, a distance image is handled as the target image 10.

Various methods of acquiring, by the computation unit 2020, the target image 10 are employable. The computation unit 2020, for example, receives the target image 10 transmitted from the camera 50. In addition, the computation unit 2020, for example, accesses the camera 50 and acquires the target image 10 stored in the camera 50.

Note that, the camera 50 may store the target image 10 in a storage apparatus provided outside the camera 50. In this case, the computation unit 2020 accesses the storage apparatus and acquires the target image 10. Therefore, in this case, the flow-rate information output apparatus 2000 and the camera 50 may not necessarily be connected communicably.

When a part or a whole of a function of the flow-rate information output apparatus 2000 is achieved by the camera 50, the flow-rate information output apparatus 2000 acquires the target image 10 generated by the flow-rate information output apparatus 2000 itself. In this case, the target image 10 is stored, for example, in a storage apparatus (e.g., the storage device 1080) present inside the flow-rate information output apparatus 2000. Therefore, the computation unit 2020 acquires the target image 10 from the storage apparatus.

Any timing of acquiring, by the computation unit 2020, the target image 10 is applicable. The computation unit 2020 acquires, for example, every time the target image 10 is generated by the camera 50, the newly-generated target image 10. In addition, the computation unit 2020 may periodically acquire, for example, an unacquired target image 10. When, for example, the computation unit 2020 acquires the target image 10 once every one second, the computation unit 2020 collectively acquires one or more target images 10 generated in one second (30 target images 10 when the camera 50 is, for example, a video camera having a frame rate of 30 frames per second (fps)).

The computation unit 2020 may acquire all target images 10 generated by the camera 50, or may acquire some target images 10. In the latter case, the computation unit 2020 acquires, for example, the target image 10 generated by the camera 50 at a rate of one with respect to a predetermined number.

<Regarding Surveillance Location 30>

The surveillance location 30 is included in an image-capture range of the camera 50, and is also a place through which the object 20 passes. The surveillance location 30 may be a place where a surveillance direction is limited as in a passage, or may be a place where a surveillance direction is not specifically limited such as an open space.

The surveillance location 30 is determined by one or more surveillance lines 32. Each surveillance line 32 is associated with one or more surveillance directions 34. Then, the number of objects 20 passing through the surveillance location 30 toward the surveillance direction 34 is represented by the number of objects 20 passing through the surveillance line 32 associated with the surveillance direction 34 toward the surveillance direction 34.

Figure 5C:
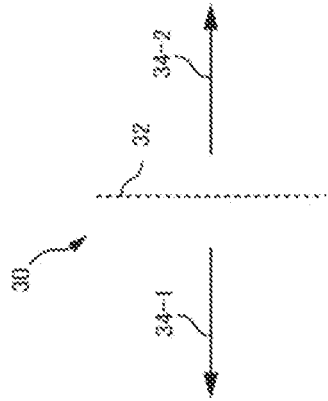
FIGS. 5A to 5D are diagrams illustrating a surveillance location and a surveillance direction.
Figure 5D:
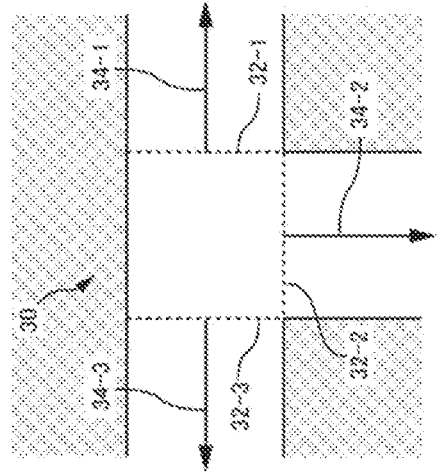
Figure 5A:
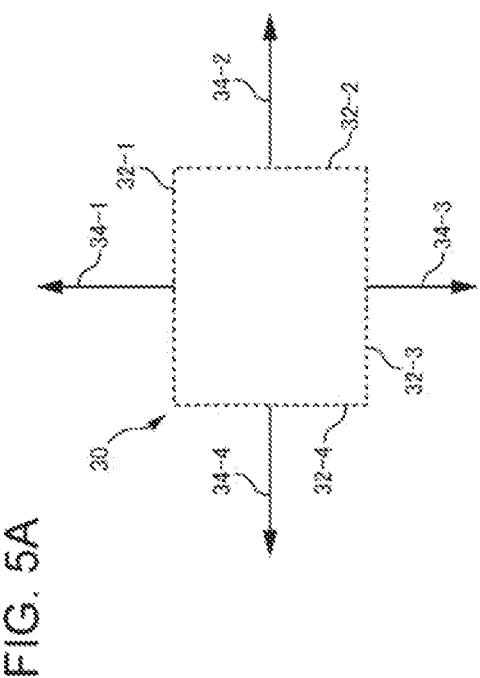

FIGS. 5A to 5D are diagrams illustrating the surveillance location 30 and the surveillance direction 34. In FIG. 5A, the surveillance location 30 is determined as a rectangular region (a set of surveillance lines 32 each representing each of four sides of a rectangle) in an open space where a movable direction is not specifically limited. Then, with respect to each surveillance line 32, the surveillance direction 34 representing a direction heading toward an outside of the rectangular region is determined. Specifically, each surveillance line 32 is associated with the surveillance direction 34 which is orthogonal to the surveillance line 32 and represents a direction heading toward an outside of the rectangle.

Figure 5B:
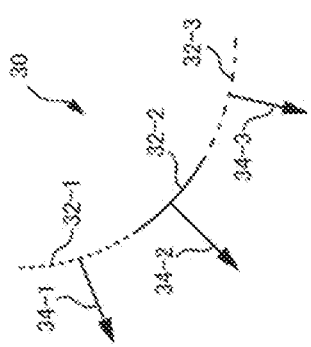

The surveillance direction 34 is not necessarily limited to an outward direction of a region. In the example of FIG. 5B for example, the surveillance direction 34 may be determined in such a way as to head toward an inside of a rectangular region, or both of the surveillance direction 34 heading toward an outside of a rectangular region and the surveillance direction 34 heading toward an inside of the rectangular region may be determined. Further, the surveillance direction 34 may not necessarily be directed orthogonally to the relevant surveillance line 32.

In FIG. 5B the surveillance location 30 is determined by one surveillance line 32. Then, each of two directions orthogonal to the line is determined as the surveillance direction 34.

In FIG. 5C, the surveillance location 30 is determined as one curve including three surveillance lines 32. In other words, each surveillance line 32 is a partial curve of one curve. As the surveillance direction 34 relevant to the surveillance line 32, two normal directions opposite to each other passing through a center of the surveillance line 32 are determined.

In FIG. 5D, the surveillance location 30 is determined by three surveillance lines 32. A T-shaped intersection portion is specified as the surveillance location 30 by these three surveillance lines 32. The surveillance direction 34 is determined as a direction going out from the T-shaped intersection.

It is assumed that the surveillance location 30 is previously determined in association with the camera 50. In other words, discrimination information of the camera 50 and information (hereinafter, referred to as surveillance location information) determining the surveillance location 30 are previously stored in a storage apparatus in association with each other.

Information determining the surveillance location 30 is represented by information (hereinafter, referred to as surveillance line information) determining each surveillance line 32 configuring the surveillance location 30. The surveillance line information indicates, for example, a set of pixels on the surveillance line 32. When the surveillance line 32 is a straight line, surveillance line information may indicate coordinates of both ends of the surveillance line 32.

Herein, as the camera 50, a camera an image-capture range of which is changed over time as in a PTZ camera and the like is usable. When an image-capture range of a camera is changed over time in such a manner, as a technique for determining the same place from each captured image generated by the camera, an existing technique is usable. In this case, as surveillance line information, for example, information determining not the surveillance line 32 in a specific target image 10 but the surveillance line 32 on a three-dimensional space including an image-capture range of the camera 50 is prepared. In this case, the surveillance line 32 in the target image 10 generated by the camera 50 at a certain point of time can be determined by mapping the surveillance line 32 in the three-dimensional space on the target image 10, by using a set value (a location of a camera, rotation of a camera, a zoom value of a camera, and the like) of the camera 50 at the point of time.

Information determining the surveillance direction 34 is also included in surveillance location information. Specifically, surveillance line information and the surveillance direction 34 relevant to the surveillance line 32 determined by the surveillance line information are associated with each other.

<Computation of Number of Objects 20: S104>

The computation unit 2020 computes, with respect to each surveillance direction 34, the number of objects 20 passing through the surveillance location 30 toward the surveillance direction 34 (S104). Herein, "the number of objects 20 passing through the surveillance location 30 toward the surveillance direction 34" is represented by the number of objects 20 passing through the surveillance line 32 relevant to the surveillance direction 34 toward the surveillance direction 34. Hereinafter, "the number of objects 20 passing through the surveillance location 30 toward the surveillance direction 34" is also referred to as "the number of objects 20 passing through the surveillance line 32 toward the surveillance direction 34".

The number of objects 20 passing through the surveillance location 30 is computed in a predetermined time width (a unit time). When, for example, a unit time is one second, the computation unit 2020 uses a plurality of target images 10 generated in one second, and computes, with respect to each surveillance direction 34, the number of objects 20 passing through the surveillance line 32 in the one second toward the surveillance direction 34.

Note that, in order to compute the number of objects 20 passing through the surveillance line 32, an interval may be set. The computation unit 2020 repeatedly executes, for example, processing of "computing a passing number of objects 20 in an X second period, and thereafter setting an interval for a Y second period (not computing a passing number of objects 20 with respect to the Y second period)".

Herein, as a technique for "computing the number of objects passing through a predetermined place toward a predetermined direction by using a time-series image including the place", an existing technique used for people-flow estimation and the like is usable.

<Generation of Flow Rate Mark 40: S106>

The output unit 2040 generates, with respect to one or more surveillance directions 34, the flow rate mark 40, based on the number of objects 20 passing through the surveillance location 30 toward the surveillance direction 34 (S106). The flow rate mark 40 is any image representing, based on a size of the mark, a number of the mark, or a color of the mark, a multitude of the number of objects. As a shape of the flow rate mark 40, any shape is usable. However, a shape of the flow rate mark 40 is preferably a shape capable of representing a relevant surveillance direction 34.

Figure 6A:
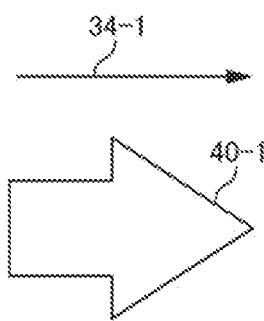
FIGS. 6A and 6B are diagrams illustrating a flow rate mark.
Figure 6B:
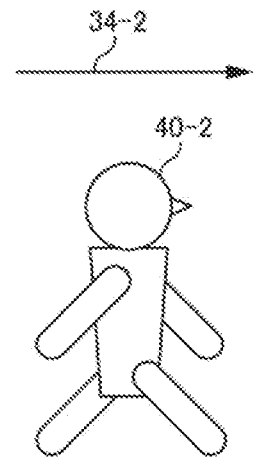

FIGS. 6A and 6B are diagrams illustrating the flow rate mark 40. A flow rate mark 40-1 is achieved as an arrow heading toward a surveillance direction 34-1. On the other hand, a flow rate mark 40-2 is achieved by an image representing the object 20 directed to a surveillance direction 34-2. In this example, it is assumed that a person is handled as the object 20, and therefore the flow rate mark 40-2 is represented by an image of a person directed to the surveillance direction 34-2.

When a multitude of the number of objects is represented by a size of the flow rate mark 40, a size of the flow rate mark 40 is determined according to the number of objects 20 passing through the surveillance location 32 toward the surveillance direction 34 relevant to the flow rate mark 40. The size is determined, for example, by a relative number with respect to a total (hereinafter, referred to as a total passing number) of numbers of objects 20 passing through the surveillance location 30 toward each surveillance direction 34. For example, a reference size Sb is determined. Then, it is assumed that a total passing number is Na and the number of objects 20 passing through the surveillance location 32 toward a certain surveillance direction 34 is n. In this case, it is assumed that the output unit 2040 sets a size of the flow rate mark 40 relevant to the surveillance direction 34 as Sb*(n/Na).

Herein, a total passing number of objects 20 in the surveillance location 30 is computed as a total value of numbers of objects 20 passing toward each surveillance direction 34 in each surveillance line 32 included in the surveillance location 30. For example, in an example of FIG. 5D, a total passing number is a total value of the number of objects 20 passing through a surveillance line 32-1 toward a surveillance direction 34-1, the number of objects 20 passing through a surveillance line 32-2 toward a surveillance direction 34-2, and the number of objects 20 passing through a surveillance line 32-3 toward a surveillance direction 34-3. Therefore, in the example of FIG. 5D, a total value of numbers of objects 20 moving toward an outside of a T-shaped intersection is a total passing number. Therefore, when a size of the flow rate mark 40 is determined based on a relative number to a total passing number, a size of the flow rate mark 40 relevant to a certain surveillance direction 34 is proportional to a value acquired by dividing the number of objects 20 going out from a T-shaped intersection toward the surveillance direction 34 by the number (a total passing number) of objects 20 going out from the T-shaped intersection toward any direction.

A size of the flow rate mark 40 relevant to the surveillance direction 34 may be determined based on an absolute number of objects 20 passing through the surveillance line 32 toward the surveillance direction 34. For example, a reference value Nb of an absolute number of objects 20 relevant to the reference size Sb is determined. In this case, the output unit 2040 sets a size of the flow rate mark 40 as Sb*(n/Nb), based on a number n of objects 20 passing through the surveillance line 32 toward the surveillance direction 34.

Note that, a size of the flow rate mark 40 may be normalized based on a size (length) of the surveillance line 32. It is assumed that, for example, the surveillance location 30 is configured by three surveillance lines 32, surveillance lines L1 to L3. Then, it is assumed that lengths of the surveillance lines L1 to L3 are l1 to l3, respectively. In this case, normalization is made by multiplying a size of the flow rate mark 40 computed based on any one of the methods described above by a ratio of a length of the surveillance line 32. For example, regarding the surveillance line L1, a ratio of a length of the surveillance line 32 is represented by l1/(l1+l2+l3). When normalization is made in such a manner, the number of objects for a width, a space, or the like of a passage indicated by the surveillance line 32 is represented, and a degree of danger, a height of necessity for surveillance, and the like can be represented by the flow rate mark 40.

Note that, the above-described size of the flow rate mark 40 may indicate a size of an entire flow rate mark 40, or may indicate a size of only a part (e.g., a length of an arrow mark) of the flow rate mark 40. In other words, in the former case, according to the number of objects 20 passing through the surveillance line 32 toward the surveillance direction 34, a size of the entire flow rate mark 40 relevant to the surveillance direction 34 is determined. On the other hand, in the latter case, according to the number of objects 20 passing through the surveillance line 32 toward the surveillance direction 34, a size of a specific portion of the flow rate mark 40 relevant to the surveillance direction 34 is determined.

The output unit 2040 generates the flow rate mark 40 having a computed size. For example, in a reference size and a reference direction, a source image being a basis of the flow rate mark 40 is prepared. The output unit 2040 generates, from a source image, the flow rate mark 40 relevant to the surveillance direction 34. Specifically, the output unit 2040 applies, to a source image, size conversion based on a computed size, rotation processing based on the surveillance direction 34, or the like, and generates the flow rate mark 40.

Note that, only for some surveillance directions 34 of surveillance directions 34 for which the number of objects 20 is computed by the computation unit 2020, the flow rate mark 40 may be generated. The output unit 2040 generates the flow rate mark 40, for example, only for the surveillance direction 34 in which a computed absolute number of objects 20 is equal to or more than a predetermined value. In addition, the output unit 2040 generates the flow rate mark 40, for example, only for the surveillance direction 34 in which a relative number of objects 20 computed for the surveillance direction 34 is equal to or more than a predetermined value. Further, when normalization based on a size of the surveillance line 32 is made, the output unit 2040 may generate only the flow rate mark 40 in which a size after normalization is equal to or more than a predetermined value.

According to these methods, only for the surveillance direction 34 in which the number of objects 20 is relatively large, the flow rate mark 40 can be generated. Therefore, only for the surveillance direction 34 in which an occurrence probability of trouble due to congestion is relatively high, the flow rate mark 40 is generated. Therefore, by viewing such a flow rate mark 40, a place and a moving direction in which dangerousness, necessity for surveillance, necessity for guidance, and the like are relatively high can be easily recognized.

Note that, only for the surveillance direction 34 in which the number of objects 20 is relatively small, the flow rate mark 40 may be generated. In other words, only for the surveillance direction 34 in which an absolute number or a relative number of objects 20 is equal to or less than a predetermined value, the flow rate mark 40 may be generated. Regarding the surveillance direction 34 in which the number of objects 20 is relatively small, it is conceivable that the object 20 is guided in such a way that the number of objects 20 moving in the direction is increased and thereby congestion relaxation and danger avoidance are made possible. Therefore, by viewing such a flow rate mark 40, a place and a direction suitable for guiding the object 20 can be easily recognized.

A magnitude of the number of objects 20 may be represented by the number of flow rate marks 40. In this case, the number of flow rate marks 40 is determined according to the number of objects 20 passing through the surveillance line 32 toward the surveillance direction 34 relevant to the flow rate mark 40.

Figure 8:
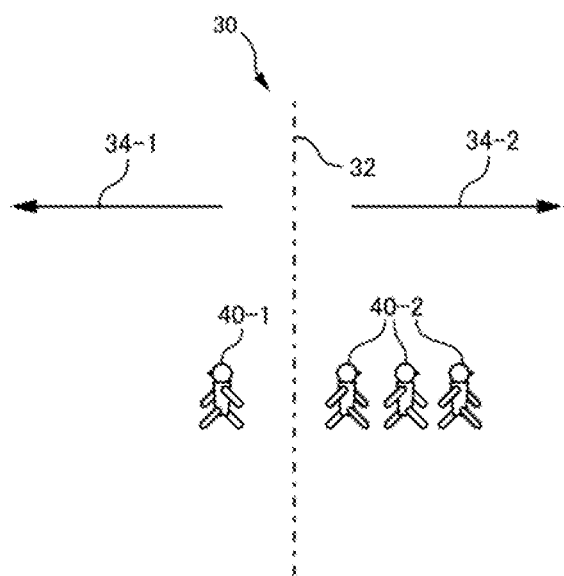
FIG. 8 is a diagram illustrating a case where, according to the number of objects, the number of flow rate marks is determined.

FIG. 8 is a diagram illustrating a case where the number of flow rate marks 40 is determined according to the number of objects 20. In the case of FIG. 8, the number of objects 20 passing through the surveillance line 32 toward a surveillance direction 34-2 is three times as large as the number of objects 20 passing through the surveillance line 32 toward a surveillance direction 34-1. Therefore, the number of flow rate marks 40-2 relevant to the surveillance direction 34-2 is three, and the number of flow rate marks 40-1 relevant to the surveillance direction 34-1 is one.

The number of flow rate marks 40 may be the same number as the number of objects 20 passing through the surveillance line 32 toward the surveillance direction 34 relevant to the flow rate mark 40, or may not necessarily be the same number. In the latter case, the number of flow rate marks 40 is determined, for example, as a number proportional to the number of objects 20 passing through the surveillance line 32 toward the surveillance direction 34 relevant to the flow rate mark 40. As a specific method therefor, a method similar to a method of determining a size of the flow rate mark 40 according to a magnitude of the number of objects 20 is usable.

For example, a reference number Tb of flow rate marks 40 is determined, and when a total passing number of objects 20 is Na and the number of objects 20 passing through the surveillance line 32 toward a certain surveillance direction 34 is n, the output unit 2040 sets, as Tb*(n/Na), the number of flow rate marks 40 relevant to the surveillance direction 34. In addition, a reference value Nb of an absolute number of objects 20 relevant to the reference number Tb is determined, and based on a number n of objects 20 passing through the surveillance line 32 toward the surveillance direction 34, the number of flow rate marks 40 may be set as Tb*(n/Nb). Note that, similarly to a size of the flow rate mark 40, the above-described normalization may be made with respect to the number of flow rate marks 40.

Note that, as a result of computing, based on the above-described method, the number of flow rate marks 40, the computation result may not always be an integer. In this case, the output unit 2040 adjusts, as an integer, the number of flow rate marks 40, for example, by using any method such as rounding and cutoff. In addition, the output unit 2040 changes, for example, a size of the flow rate mark 40 from a reference size, and thereby may represent a number less than one. When, for example, a result of computing the number of flow rate marks 40 is 3.4, three flow rate marks 40 having a reference size and one flow rate mark 40 having a size 0.4 times as large as the size are used, and thereby 3.4 flow rate marks 40 can be represented.

A magnitude of the number of objects 20 may be represented by a color of the flow rate mark 40. In this case, a color of the flow rate mark 40 is determined according to the number of objects 20 passing through the surveillance line 32 toward the surveillance direction 34 relevant to the flow rate mark 40.

For example, an association relation between a ratio of the number of objects 20 passing through the surveillance line 32 toward the surveillance direction 34 and a color relevant to the ratio is previously determined. A ratio of the number of objects 20 referred to herein is a ratio with respect to the above-described total passing number or reference number. The output unit 2040 computes a ratio of the number of objects 20 passing through the surveillance line 32 toward the surveillance direction 34 relevant to the flow rate mark 40, determines a color associated with the ratio, and generates the flow rate mark 40 of the color.

FIG. 9 is a diagram illustrating a case where a color of the flow rate mark 40 is determined according to a ratio of the number of objects 20. In the example of FIG. 9, an association relation between a ratio and a color is determined in such a way that as a ratio is closer to one, a color is darker. Further, in the example of FIG. 9, a flow rate mark 40-1 is lighter in color than a flow rate mark 40-2. From this fact, it is understandable that the number of objects 20 passing through the surveillance line 32 toward a surveillance direction 34-1 is smaller than the number of objects 20 passing through the surveillance line 32 toward a surveillance direction 34-2.

Note that, a relation between a ratio and a color is not limited to a relation in that as a ratio is higher, a color is darker, and therefore any relation can be determined.

<Output of Result Image 60: S108>

The output unit 2040 outputs the result image 60 (S108). The result image 60 is an image generated by superimposing the flow rate mark 40 on an image including the surveillance location 30. As described above, "an image including the surveillance location 30" may be the target image 10 used for generating the flow rate mark 40, may be a background image, or may be a map image including the surveillance location 30. Note that, the result image 60 preferably includes, in addition to the flow rate mark 40, an image representing the surveillance location 30 (an image representing the surveillance line 32 and the surveillance direction 34) and an image representing the number of objects.

Any output destination of the result image 60 is applicable. The output unit 2040 outputs the result image 60, for example, to a display apparatus connected to the flow-rate information output apparatus 2000. In other words, the result image 60 is displayed on the display apparatus. In addition, the output unit 2040 transmits the result image 60, for example, to an apparatus (e.g., a mobile terminal used by a user such as a security guard) other than the flow-rate information output apparatus 2000. Thereby, the result image 60 is displayed on a display apparatus connected to another apparatus. In addition, the output unit 2040 may store the result image 60, for example, in a storage apparatus accessible from the flow-rate information output apparatus 2000.

A location of the flow rate mark 40 in the result image 60 is preferably close to a relevant surveillance line 32. The output unit 2040 superimposes the flow rate mark 40, for example, on a location moved (shifted) from a location of a relevant surveillance line 32 toward a relevant surveillance direction 34.

Figure 7:
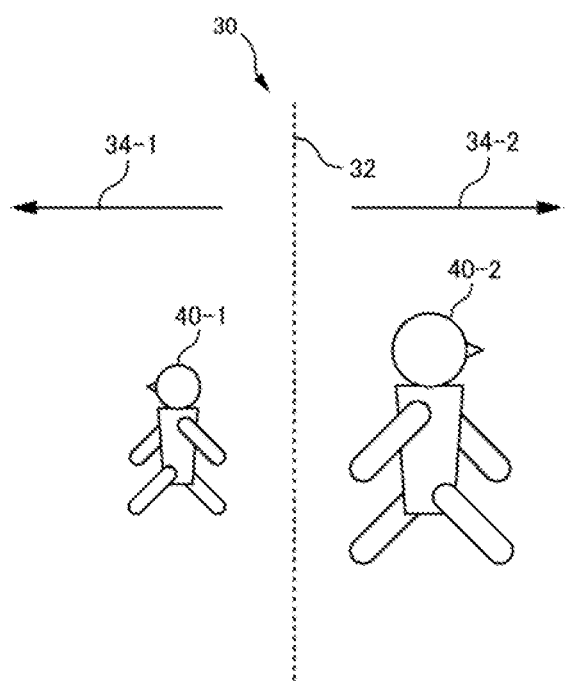
FIG. 7 is a first diagram illustrating a location of a flow rate mark in a result image.

FIG. 7 is a first diagram illustrating a location of the flow rate mark 40 in the result image 60. In FIG. 7, a surveillance direction 34-1 relevant to a flow rate mark 40-1 is directed in a left direction. Therefore, the flow rate mark 40-1 is superimposed on a location moved from the surveillance line 32 to a left direction. On the other hand, a surveillance direction 34-2 relevant to a flow rate mark 40-2 is directed in a right direction. Therefore, the flow rate mark 40-2 is superimposed on a location moved from the surveillance line 32 to a right direction.

Figure 10:
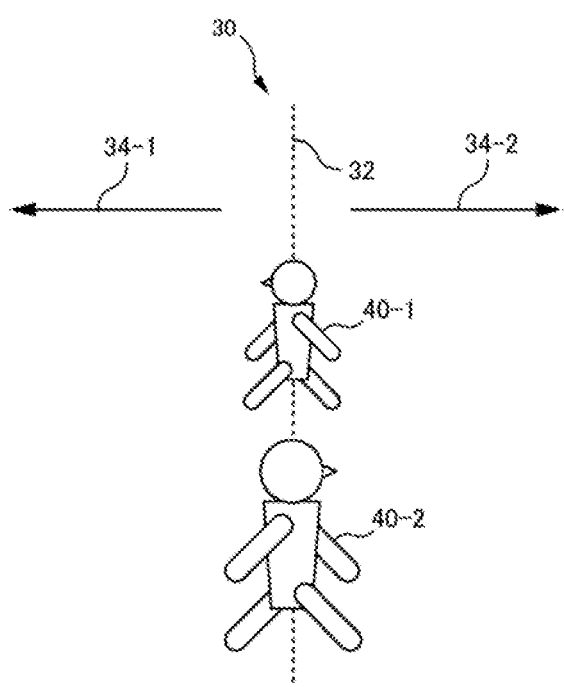
FIG. 10 is a second diagram illustrating a location of a flow rate mark in a result image.

A location of the flow rate mark 40 in the result image 60 may not always be determined based on the surveillance direction 34. FIG. 10 is a second diagram illustrating a location of the flow rate mark 40 in the result image 60. In this example, both of the flow rate marks 40-1 and 40-2 are superimposed on the surveillance line 32. However, locations of the flow rate marks 40-1 and 40-2 are slightly shifted, and thereby the flow rate mark 40 is easily viewed.

<Output of Past Information>

The output unit 2040 may further include, in the result image 60, information relating to the number of objects 20 computed for the surveillance location 30 in a past. The output unit 2040 computes, for example, statistical information relating to the number of objects 20 at n past points of time, and includes the statistical information in the result image 60. Note that, "n pasts" may include a present, or may not necessarily include a present. Statistical information is, for example, a statistical value of numbers of objects 20 at n past points of time or a graph representing transition of numbers of objects 20 at n past points of time.

Figure 11:
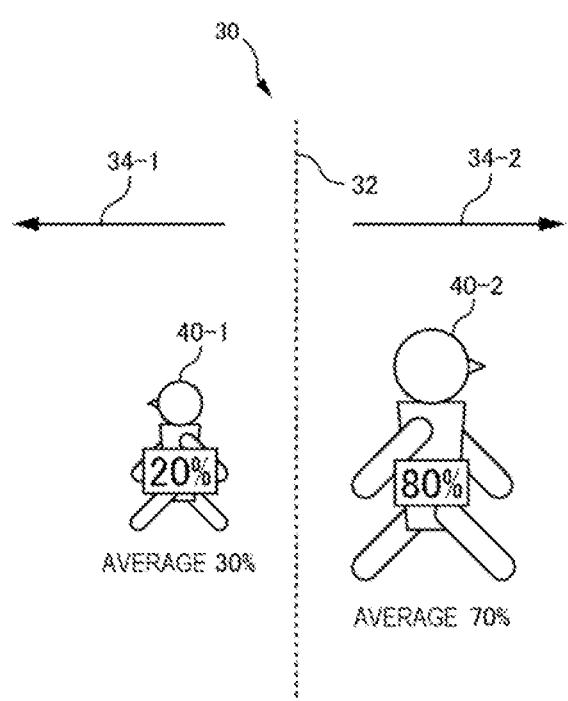
FIG. 11 is a diagram illustrating statistical information included in a result image.
Figure 12:
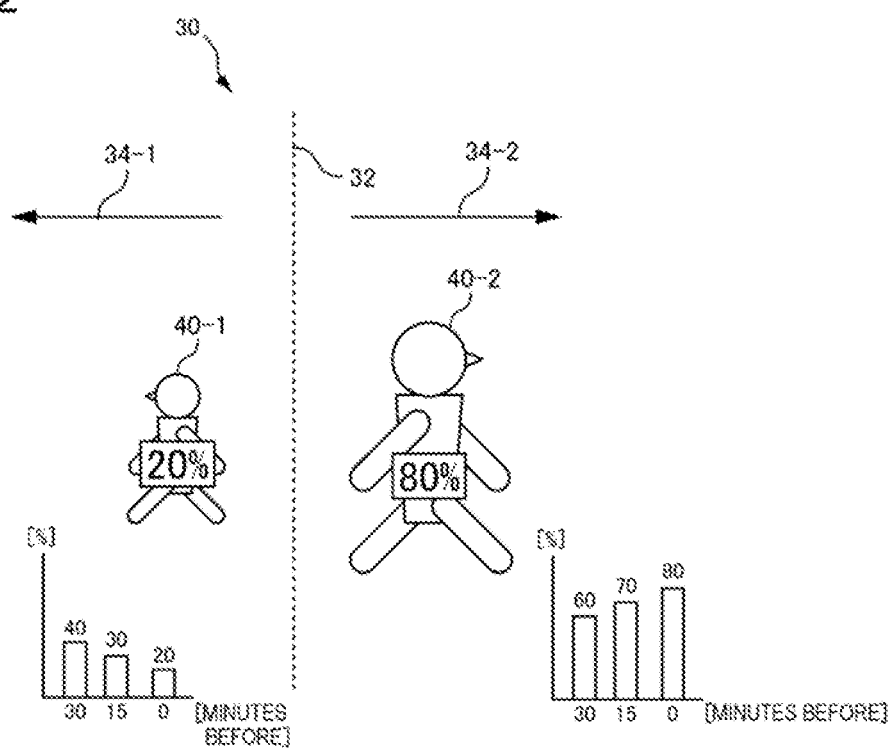
FIG. 12 is a diagram illustrating statistical information included in a result image.
Figure 13:
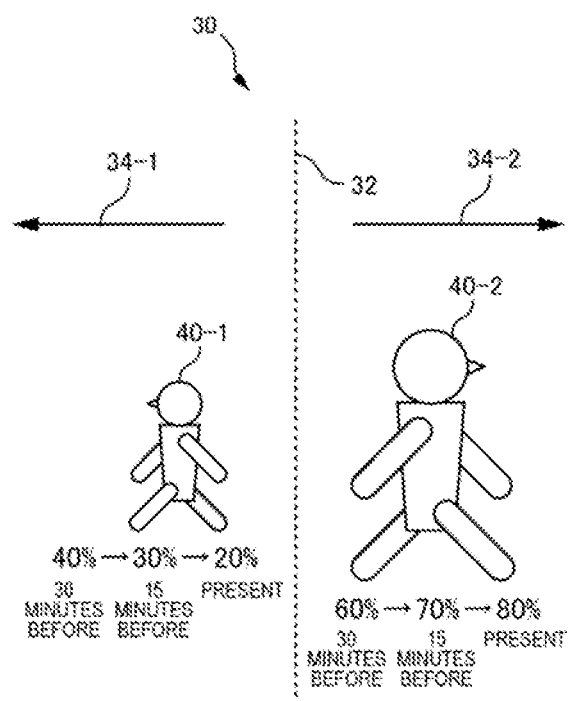
FIG. 13 is a diagram illustrating statistical information included in a result image.

FIGS. 11 to 13 each are a diagram illustrating statistical information included in the result image 60. Note that, in these diagrams, the flow rate mark 40 includes a numerical value representing a relative number of the number of objects 20 represented by the flow rate mark 40.

In FIG. 11, with regard to each surveillance direction 34, for the number of objects 20 in the surveillance direction 34, an average value based on three points of time, being a present, 15 minutes before, and 30 minutes before, is illustrated. In FIG. 12, with regard to each surveillance direction 34, for each of these three points of time, the number of objects 20 in the surveillance direction 34 is represented by a bar chart. In FIG. 13, with regard to each surveillance direction 34, for each of the above-described three points of time, a relative number of objects 20 in the surveillance direction 34 is illustrated by a numerical value.

Note that, it is assumed that the number of objects 20 computed in a past is stored in a storage apparatus. In other words, the computation unit 2020 stores, in the storage apparatus, the number of objects 20 computed with respect to each surveillance direction 34 in association with temporal information. Temporal information associated with the number of objects 20 is used for determining for what point of time the number of objects 20 represents a situation. Temporal information associated with the number of objects 20 is, for example, a computation point of time of the number of objects 20, a generation point of time of the target image 10 used for computing the number of objects 20, or the like. Note that, when a plurality of target images 10 are used, a point of time such as a generation point of time of the target image 10 newest among the images, a generation point of time of the target image 10 oldest among the images, and an average value of generation points of time of each target image 10 is usable as temporal information.

<Output of Prediction Information>

The output unit 2040 predicts, from the number of objects 20 passing through the surveillance location 30 computed with respect to each surveillance direction 34, the number of objects 20 at a future point of time, and may include information representing the predicted number of objects 20 in the result image 60. The output unit 2040 generates, with respect to each surveillance direction 34, for example, by using the number of objects 20 at each of a plurality of points of time computed so far for the surveillance direction 34, a time-series model representing a temporal change of the number of objects 20. As a type of a time-series model, any type is usable.

When the above-described temporal model is used, with respect to each surveillance direction 34, the number of objects 20 at any point of time in a future can be predicted. The output unit 2040 computes, with respect to each surveillance direction 34, for example, by using a temporal model generated for the surveillance direction 34, the number of objects 20 after a predetermined time (e.g., after 15 minutes) from a present point of time.

Figure 14:
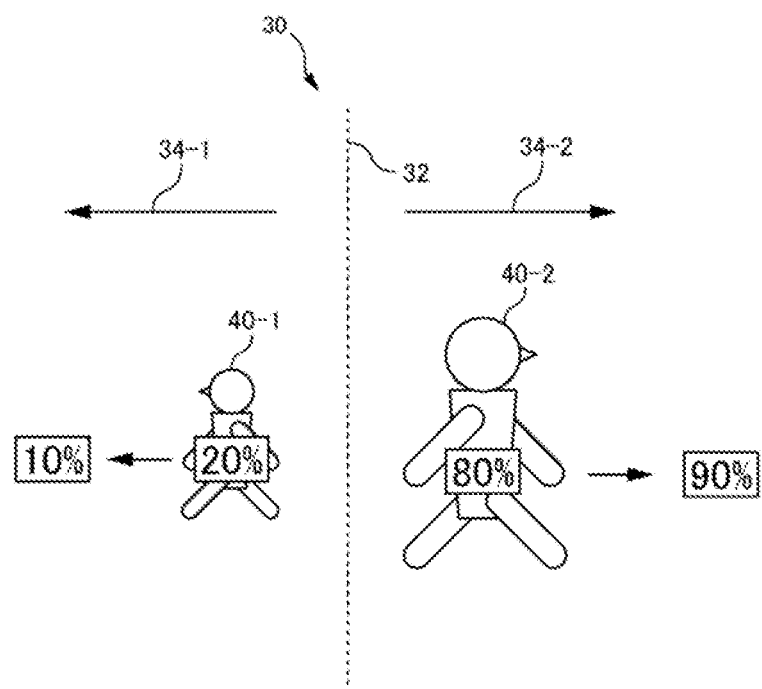
FIG. 14 is a diagram illustrating a case where prediction information is output.
Figure 15:
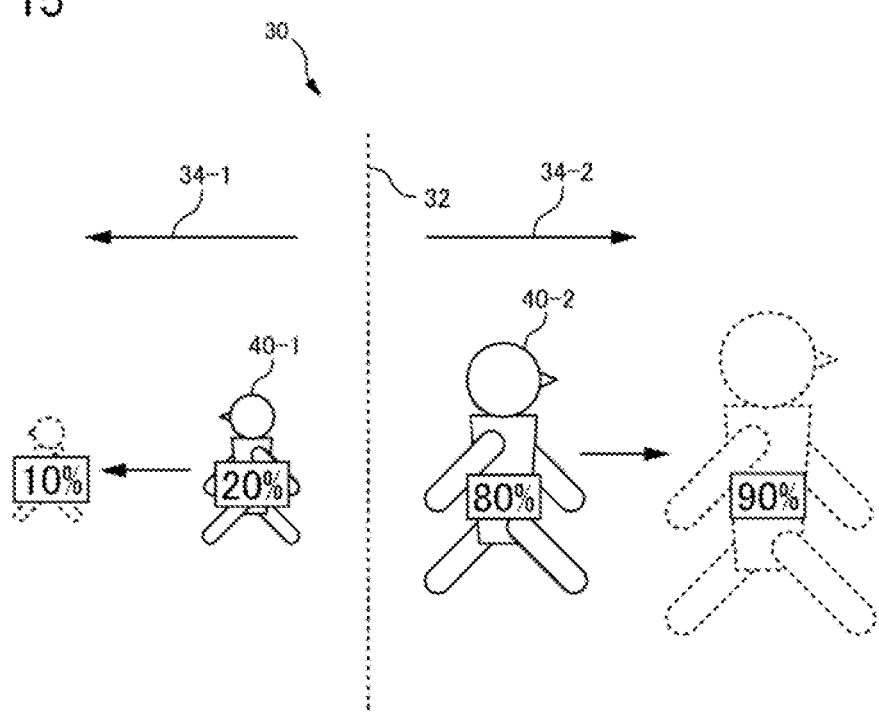
FIG. 15 is a diagram illustrating a case where prediction information is output.

FIGS. 14 and 15 each are a diagram illustrating a case where prediction information is output. At a present point of time, a relative number of objects 20 passing through the surveillance location 30 toward a surveillance direction 34-1 is 20%, and a relative number of objects 20 passing through the surveillance location 30 toward a surveillance direction 34-2 is 80%. Further, the output unit 2040 computes, as the number of objects 20 passing through the surveillance location 30 after 15 minutes, prediction values being 10% and 90% for the surveillance direction 34-1 and the surveillance direction 34-2, respectively.

In FIG. 14, a prediction value is output. On the other hand, in FIG. 15, not only a prediction value but also a flow rate mark of a size based on the prediction value are output.

Figure 16:
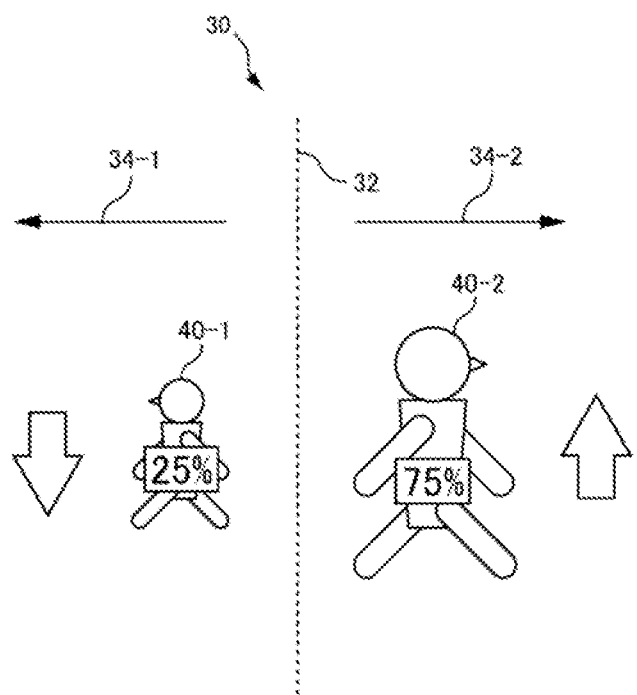
FIG. 16 is a diagram illustrating a case where prediction information is represented by comparison with present information.

As future prediction, a specific value may not necessarily be output. The output unit 2040 outputs, for example, information representing comparison with a present such as an increase, a decrease, or no increase or decrease. FIG. 16 is a diagram illustrating a case where prediction information is represented based on comparison with present information. In FIG. 16, it is predicted that the number of objects 20 passing through the surveillance location 30 toward a surveillance direction 34-1 decreases. Therefore, a downward-pointing arrow mark is output laterally to a flow rate mark 40-1. On the other hand, it is predicted that the number of objects 20 passing through the surveillance location 30 toward a surveillance direction 34-2 increases. Therefore, an upward-pointing arrow mark is output laterally to a flow rate mark 40-2. Note that, herein, an arrow mark is used as information representing an increase/decrease, but information representing an increase/decrease may be another graphic or a numerical value when it is possible to represent an increase/decrease. In addition, information representing an increase/decrease may be indicated by changing a color of a flow rate mark.

Note that, prediction may be executed for a plurality of points of time (15 minutes after, 30 minutes after, 45 minutes after, and the like). In this case, the output unit 2040 outputs, similarly to past information, future information, for example, as statistical information (a statistical value of numbers of objects 20 computed for a plurality of points of time, a graph representing a change of numbers of objects 20 computed for a plurality of points of time, or the like).

Modified Example

A flow-rate information output apparatus 2000 may generate a result image 60 including only prediction information without including present information. The flow-rate information output apparatus 2000 generates and outputs, for example, based on the number of objects 20 predicted for a future, a flow rate mark 40, instead of computing, based on the number of objects 20 at a present, the flow rate mark 40. In addition, the flow-rate information output apparatus 2000 may generate, without including the flow rate mark 40 in the result image 60, for example, the result image 60 including information relating to a tendency (an increase, a decrease, no increase or decrease, or the like) of the number of objects 20 in a future as in an upward-pointing or downward-pointing arrow or the like in FIG. 16. Note that, in the above description, information representing comparison between a present and a prediction (future) such as an increase, a decrease, or no increase or decrease is indicated, but information representing comparison between a past and a present such as an increase, a decrease, or no increase or decrease can be indicated similarly.

While with reference to the accompanying drawings, the example embodiments according to the present invention have been described, the example embodiments are exemplification of the present invention, and various configurations other than the above-described configurations are employable.

The whole or part of the example embodiment described above can be described as, but not limited to, the following supplementary notes.

1. A flow-rate information output apparatus including:
    a computation unit that computes, by using a target image including an object passing through a surveillance place, the number of the objects passing through the surveillance place with respect to each of a plurality of surveillance directions; and
    an output unit that generates, with respect to at least one surveillance direction, a flow rate mark relevant to the number of the objects passing through the surveillance place toward the surveillance direction, and generates a result image by superimposing the flow rate mark on an image including the surveillance place.

2. The flow-rate information output apparatus according to supplementary note 1, wherein
    the surveillance place includes one or more surveillance lines each associated with one or more surveillance directions, and
    the computation unit computes, as the number of the objects passing through the surveillance place toward the surveillance direction, the number of the objects passing through the surveillance line associated with the surveillance direction toward the surveillance direction.

3. The flow-rate information output apparatus according to supplementary note 2, wherein
    the output unit generates, as a flow rate mark relevant to the number of the objects passing through a certain surveillance line toward a certain surveillance direction, a mark representing the surveillance direction, and superimposes the generated flow rate mark on a vicinity of the surveillance line in an image including the surveillance place.

4. The flow-rate information output apparatus according to any one of supplementary notes 1 to 3, wherein
    the computation unit computes the number of the objects passing through the surveillance place toward the surveillance direction as a relative number with respect to a total number of the objects passing through the surveillance place toward the each surveillance direction.

5. The flow-rate information output apparatus according to any one of supplementary notes 1 to 4, wherein
    the output unit determines a size of the flow rate mark relevant to the surveillance direction, based on the number of the objects passing through the surveillance place toward the surveillance direction.

6. The flow-rate information output apparatus according to any one of supplementary notes 1 to 5, wherein
    the output unit determines the number of the flow rate marks relevant to the surveillance direction, based on the number of the objects passing through the surveillance place toward the surveillance direction.

7. The flow-rate information output apparatus according to any one of supplementary notes 1 to 5, wherein
    the output unit determines a color of the flow rate mark relevant to the surveillance direction, based on the number of the objects passing through the surveillance place toward the surveillance direction.

8. The flow-rate information output apparatus according to any one of supplementary notes 1 to 7, wherein
    the surveillance place includes one or more surveillance lines each associated with one or more surveillance directions, and
    the output unit normalizes a size of the flow rate mark or the number of the flow rate marks relevant to the surveillance direction, by a length of the surveillance line relevant to the surveillance direction.

9. The flow-rate information output apparatus according to any one of supplementary notes 1 to 8, wherein
    the output unit computes, with respect to each of a plurality of points of time, the number of the objects passing through the surveillance place toward the surveillance direction, and includes, in the result image, statistical information of numbers of the objects at the plurality of points of time.

10. The flow-rate information output apparatus according to any one of supplementary notes 1 to 9, wherein
    the output unit predicts, with respect to a future point of time, the number of the objects passing through the surveillance place toward the surveillance direction, and includes, in the result image, information relating to the predicted number of the objects.

11. The flow-rate information output apparatus according to any one of supplementary notes 1 to 10, wherein
    the output unit
        predicts, with respect to a future point of time, the number of the objects passing through the surveillance place toward the surveillance direction, and
        includes, with respect to each surveillance direction of each surveillance place, information representing a result of comparison between numbers of the objects for a future and a present in the result image.

12. The flow-rate information output apparatus according to any one of supplementary notes 1 to 10, wherein
    the output unit
        acquires, with respect to a past point of time, information representing the number of the objects passing through the surveillance place toward the surveillance direction, and includes, with respect to each surveillance direction of each surveillance place, information representing a result of comparison between numbers of the objects for a past and a present in the result image.

13. The flow-rate information output apparatus according to any one of supplementary notes 1 to 12, wherein
the output unit includes, in the result image, an image representing the surveillance place and an image representing the number of the objects.

14. The flow-rate information output apparatus according to any one of supplementary notes 1 to 13, wherein
the surveillance place is a place where two or more passages are joined, and
the surveillance direction is a direction heading toward an outside of the surveillance place.

15. The flow-rate information output apparatus according to any one of supplementary notes 1 to 14, wherein
a shape of the flow rate mark is a shape representing the object.

16. A control method executed by a computer, the control method including:
a computation step of computing, by using a target image including an object passing through a surveillance place, the number of the objects passing through the surveillance place with respect to each of a plurality of surveillance directions; and
an output step of generating, with respect to at least one surveillance direction, a flow rate mark relevant to the number of the objects passing through the surveillance place toward the surveillance direction, and generating a result image by superimposing the flow rate mark on an image including the surveillance place.

17. The control method according to supplementary note 16, wherein
the surveillance place includes one or more surveillance lines each associated with one or more surveillance directions,
the control method further including,
in the computation step, computing, as the number of the objects passing through the surveillance place toward the surveillance direction, the number of the objects passing through the surveillance line associated with the surveillance direction toward the surveillance direction.

18. The control method according to supplementary note 17, further including,
in the output step, generating, as a flow rate mark relevant to the number of the objects passing through a certain surveillance line toward a certain surveillance direction, a mark representing the surveillance direction, and superimposing the generated flow rate mark on a vicinity of the surveillance line in an image including the surveillance place.

19. The control method according to any one of supplementary notes 16 to 18, further including,
in the computation step, computing the number of the objects passing through the surveillance place toward the surveillance direction as a relative number with respect to a total number of the objects passing through the surveillance place toward the each surveillance direction.

20. The control method according to any one of supplementary notes 16 to 19, further including,
in the output step, determining a size of the flow rate mark relevant to the surveillance direction, based on the number of the objects passing through the surveillance place toward the surveillance direction.

21. The control method according to any one of supplementary notes 16 to 20, further including,
in the output step, determining the number of the flow rate marks relevant to the surveillance direction, based on the number of the objects passing through the surveillance place toward the surveillance direction.

22. The control method according to any one of supplementary notes 16 to 20, further including,
in the output step, determining a color of the flow rate mark relevant to the surveillance direction, based on the number of the objects passing through the surveillance place toward the surveillance direction.

23. The control method according to any one of supplementary notes 16 to 22, wherein
the surveillance place includes one or more surveillance lines each associated with one or more surveillance directions,
the control method further including,
in the output step, normalizing a size of the flow rate mark or the number of the flow rate marks relevant to the surveillance direction, by a length of the surveillance line relevant to the surveillance direction.

24. The control method according to any one of supplementary notes 16 to 23, further including,
in the output step, computing, with respect to each of a plurality of points of time, the number of the objects passing through the surveillance place toward the surveillance direction, and including, in the result image, statistical information of numbers of the objects at the plurality of points of time.

25. The control method according to any one of supplementary notes 16 to 24, further including,
in the output step, predicting, with respect to a future point of time, the number of the objects passing through the surveillance place toward the surveillance direction, and including, in the result image, information relating to the predicted number of the objects.

26. The control method according to any one of supplementary notes 16 to 25, further including:
in the output step,
predicting, with respect to a future point of time, the number of the objects passing through the surveillance place toward the surveillance direction; and
including, with respect to each surveillance direction of each surveillance place, information representing a result of comparison between numbers of the objects for a future and a present in the result image.

27. The control method according to any one of supplementary notes 16 to 25, further including:
in the output step,
acquiring, with respect to a past point of time, information representing the number of the objects passing through the surveillance place toward the surveillance direction; and
including, with respect to each surveillance direction of each surveillance place, information representing a result of comparison between numbers of the objects for a past and a present in the result image.

28. The control method according to any one of supplementary notes 16 to 27, further including,
in the output step, including, in the result image, an image representing the surveillance place and an image representing the number of the objects.

29. The control method according to any one of supplementary notes 16 to 28, wherein
the surveillance place is a place where two or more passages are joined, and the surveillance direction is a direction heading toward an outside of the surveillance place.

30. The control method according to any one of supplementary notes 16 to 29, wherein
a shape of the flow rate mark is a shape representing the object.

31. A program causing a computer to execute the control method according to any one of supplementary notes 16 to 30.

REFERENCE SIGNS LIST

10 Target image
20 Object
30 Surveillance location
32 Surveillance line
34 Surveillance direction
40 Flow rate mark
50 Camera
60 Result image
1000 Computer
1020 Bus
1040 Processor
1060 Memory
1080 Storage device
1100 Input/output interface
1120 Network interface
2000 Flow-rate information output apparatus
2020 Computation unit
2040 Output unit

What is claimed is:

1. A flow-rate information output apparatus comprising:
at least one memory storing instructions; and
at least one processor configured to execute the instructions to perform operations comprising:
computing, by using a target image including an object passing through a surveillance place, a number of the objects passing through the surveillance place with respect to each of a plurality of surveillance directions;
generating, with respect to at least one surveillance direction, a flow rate mark relevant to a number of the objects passing through the surveillance place toward the surveillance direction; and
generating a result image by superimposing the flow rate mark on an image including the surveillance place, wherein
the surveillance place includes one or more surveillance lines each associated with one or more surveillance directions, and
the operations comprise normalizing a size of the flow rate mark or a number of the flow rate marks relevant to the surveillance direction, by a length of the surveillance line relevant to the surveillance direction.

2. The flow-rate information output apparatus according to claim 1, wherein
the surveillance place includes one or more surveillance lines each associated with one or more surveillance directions, and
the operations comprise computing, as a number of the objects passing through the surveillance place toward the surveillance direction, a number of the objects passing through the surveillance line associated with the surveillance direction toward the surveillance direction.

3. The flow-rate information output apparatus according to claim 2, wherein the operations comprise:
generating, as a flow rate mark relevant to a number of the objects passing through a certain surveillance line toward a certain surveillance direction, a mark representing the surveillance direction; and
superimposing the generated flow rate mark on a vicinity of the surveillance line in an image including the surveillance place.

4. The flow-rate information output apparatus according to claim 1, wherein the operations comprise
computing a number of the objects passing through the surveillance place toward the surveillance direction as a relative number with respect to a total number of the objects passing through the surveillance place toward the each surveillance direction.

5. The flow-rate information output apparatus according to claim 1, wherein the operations comprise
determining a size of the flow rate mark relevant to the surveillance direction, based on a number of the objects passing through the surveillance place toward the surveillance direction.

6. The flow-rate information output apparatus according to claim 1, wherein the operations comprise
determining a number of the flow rate marks relevant to the surveillance direction, based on a number of the objects passing through the surveillance place toward the surveillance direction.

7. The flow-rate information output apparatus according to claim 1, wherein the operations comprise
determining a color of the flow rate mark relevant to the surveillance direction, based on a number of the objects passing through the surveillance place toward the surveillance direction.

8. The flow-rate information output apparatus according to claim 1, wherein the operations comprise:
computing, with respect to each of a plurality of points of time, a number of the objects passing through the surveillance place toward the surveillance direction; and
including, in the result image, statistical information of numbers of the objects at the plurality of points of time.

9. The flow-rate information output apparatus according to claim 1, wherein the operations comprise:
predicting, with respect to a future point of time, a number of the objects passing through the surveillance place toward the surveillance direction; and
including, in the result image, information relating to the predicted number of the objects.

10. The flow-rate information output apparatus according to claim 1, wherein the operations comprise
including, in the result image, an image representing the surveillance place and an image representing a number of the objects.

11. The flow-rate information output apparatus according to claim 1, wherein
the surveillance place is a place where two or more passages are joined, and
the surveillance direction is a direction heading toward an outside of the surveillance place.

12. The flow-rate information output apparatus according to claim 1, wherein a shape of the flow rate mark is a shape representing the object.

13. A flow-rate information output apparatus comprising:
at least one memory storing instructions; and
at least one processor configured to execute the instructions to perform operations comprising:

computing, by using a target image including an object passing through a surveillance place, a number of the objects passing through the surveillance place with respect to each of a plurality of surveillance directions;

generating, with respect to at least one surveillance direction, a flow rate mark relevant to a number of the objects passing through the surveillance place toward the surveillance direction; and generating a result image by superimposing the flow rate mark on an image including the surveillance place, wherein the operations comprise:

predicting, with respect to a future point of time, a number of the objects passing through the surveillance place toward the surveillance direction; and including, with respect to each surveillance direction of each surveillance place, information representing a tendency of increase or decrease in the number of objects based on a result of comparison between numbers of the objects for a future and a present in the result image.

14. The flow-rate information output apparatus according to claim 13, wherein the surveillance place includes one or more surveillance lines each associated with one or more surveillance directions, and the operations comprise computing, as a number of the objects passing through the surveillance place toward the surveillance direction, a number of the objects passing through the surveillance line associated with the surveillance direction toward the surveillance direction.

15. The flow-rate information output apparatus according to claim 14, wherein the operations comprise:

generating, as a flow rate mark relevant to a number of the objects passing through a certain surveillance line toward a certain surveillance direction, a mark representing the surveillance direction; and superimposing the generated flow rate mark on a vicinity of the surveillance line in an image including the surveillance place.

16. The flow-rate information output apparatus according to claim 13, wherein the operations comprise computing a number of the objects passing through the surveillance place toward the surveillance direction as a relative number with respect to a total number of the objects passing through the surveillance place toward the each surveillance direction.

17. A flow-rate information output apparatus comprising:
at least one memory storing instructions; and
at least one processor configured to execute the instructions to perform operations comprising:

computing, by using a target image including an object passing through a surveillance place, a number of the objects passing through the surveillance place with respect to each of a plurality of surveillance directions;

generating, with respect to at least one surveillance direction, a flow rate mark relevant to a number of the objects passing through the surveillance place toward the surveillance direction; and generating a result image by superimposing the flow rate mark on an image including the surveillance place, wherein the operations comprise:

acquiring, with respect to a past point of time, information representing a number of the objects passing through the surveillance place toward the surveillance direction; and including, with respect to each surveillance direction of each surveillance place, information representing a tendency of increase or decrease in the number of objects based on a result of comparison between numbers of the objects for a past and a present in the result image.

18. The flow-rate information output apparatus according to claim 17, wherein the surveillance place includes one or more surveillance lines each associated with one or more surveillance directions, and the operations comprise computing, as a number of the objects passing through the surveillance place toward the surveillance direction, a number of the objects passing through the surveillance line associated with the surveillance direction toward the surveillance direction.

19. The flow-rate information output apparatus according to claim 18, wherein the operations comprise:

generating, as a flow rate mark relevant to a number of the objects passing through a certain surveillance line toward a certain surveillance direction, a mark representing the surveillance direction; and superimposing the generated flow rate mark on a vicinity of the surveillance line in an image including the surveillance place.

20. The flow-rate information output apparatus according to claim 17, wherein the operations comprise computing a number of the objects passing through the surveillance place toward the surveillance direction as a relative number with respect to a total number of the objects passing through the surveillance place toward the each surveillance direction.

* * * * *